Patented Dec. 31, 1935

2,025,939

UNITED STATES PATENT OFFICE 2,025,939

TREATMENT OF CELLULOSE ESTERS

Camille Dreyfus, New York, N. Y., and Clifford Ivan Haney, Drummondville, Quebec, Canada, assignors to Celanese Corporation of America, a corporation of Delaware No Drawing. Application May 25, 1929,
Serial No. 366,084

5 Claims. (Cl. 260—102)

This invention relates to the treatment of esters of cellulose, and more particularly to the treatment of organic esters of cellulose in order to render the same more stable at elevated temperatures.

In the preparation of esters of cellulose, sulfuric acid or other sulfur bearing acids are generally employed as catalysts in order to promote the action of the esterifying agents on the cellulose to be converted into the ester. Thus in the preparation of cellulose acetate, cellulose is acetylated by means of acetic anhydride in the presence of sulfuric acid as catalyst, and also in the presence of a diluent or solvent for the cellulose acetate, such as acetic acid. Some of the sulfuric acid present combines with the reagents present, and forms sulpho-acetates of cellulose, which are difficult to remove, and which greatly decrease the stability of the final product obtained.

We have found that if the ester of cellulose is precipitated or otherwise removed from the primary acetylation mixture, and the same dissolved in a suitable solvent and then a soluble salt of the metal capable of forming an insoluble sulphate is added to the resulting solution, a large proportion of the sulfur compound is neutralized or rendered inert, whereby an ester of cellulose of great stability is produced.

In accordance with our invention we treat esters of cellulose after they have been precipitated or otherwise removed from the primary solutions or mixtures of reagents wherein they are formed, either before or after ripening, by dissolving the same in a suitable solvent and adding to the solutions thus formed a soluble salt of a metal that forms an insoluble sulphate.

Any ester of cellulose may be treated by our invention, but we prefer to treat organic esters of cellulose such as cellulose acetate, cellulose formate, cellulose propionate and cellulose butyrate.

Before subjecting the esters of cellulose to the action of the neutralizing salt, the same should be precipitated from or otherwise removed from the primary solution or reacting mixture. We have found that if the salt capable of readily forming a sulphate is added directly to the primary solutions or reagents, the desired effect of increased stability is not obtained. Usually organic esters of cellulose are made by esterifying the cellulose in the presence of a solvent for the resulting ester of cellulose, so that upon completion of the esterification, a homogeneous solution results. The ester of cellulose may be precipitated from such solution by the addition of water or other diluent, immediately after completion of the esterification, or such primary solutions may be first subjected to after treatment known as "ripening" to produce an ester of desired solubility characteristics.

The ester of cellulose thus precipitated, either before or after ripening, and either before or after subjecting the precipitated ester of cellulose to such stabilizing treatments as have heretofore been employed, may then be dissolved in a suitable solvent such as organic acids like acetic acid, propionic acid, etc., or any other suitable solvent. To the solution thus formed is added the soluble salt of a metal that readily forms a sulphate, either in powdered form or dissolved in a suitable solvent. Examples of such salts are the acetate or chloride of barium or strontium, or the acetate of lead.

The product thus formed is much more stable than organic esters of cellulose formerly prepared, as shown by the fact that its heat test (the temperature at which it decomposes and becomes darker in color) is as high or higher than the heat test of organic esters of cellulose stabilized or purified by prior processes.

In order further to illustrate our invention but without being limited thereto, the following specific example is given.

*Example*

A cellulose acetate is formed by treating cellulose with a mixture of acetic anhydride, glacial acetic acid and a proportion of sulfuric acid as catalyst. After the acetylation, a viscous and homogeneous solution is formed, and sufficient water is added thereto to precipitate the cellulose acetate. 200 kilograms of this precipitated cellulose acetate are dissolved in 1000 litres of glacial acetic acid, and to the solution thus formed there is added a solution of 40 kilograms of barium acetate dissolved in 200 litres of acetic acid. After this mixture is allowed to stand 3 days, the cellulose acetate is precipitated by the addition of a large quantity of water, is then washed and dried. The cellulose acetate thus purified has a heat test of about 70° C. higher than one which has not been subjected to the action of the barium salt, but which has been merely washed and dried after precipitation from the solution in which it was formed.

Having described our invention, what we claim and desire to secure by Letters Patent is:

1. Process for stabilizing organic esters of cellulose that have been prepared in the presence of a sulfur-bearing acid catalyst, which comprises separating the organic ester of cellulose from the primary solution in which it is formed, dissolving the same in a solvent therefor, and then adding a soluble barium salt.

2. Process for stabilizing cellulose acetate that has been prepared in the presence of a sulfur-bearing acid catalyst, which comprises separating the cellulose acetate from the primary solution in which it is formed dissolving the same in a solvent therefor, and then adding a soluble barium salt.

3. Process for stabilizing an organic ester of cellulose that has been prepared by reacting cellulose with an esterifying agent in the presence of sulfuric acid, which comprises separating the organic ester of cellulose from the primary solution in which it is formed, dissolving the same in a solvent therefor, and then adding a soluble barium salt.

4. Process for stabilizing cellulose acetate that has been prepared by reacting cellulose with acetic anhydride in the presence of sulfuric acid, which comprises separating the cellulose acetate from the primary solution in which it is formed, dissolving the same in a solvent therefor, and then adding a soluble barium salt.

5. Process for stabilizing cellulose acetate that has been prepared by reacting cellulose with acetic anhydride in the presence of sulfuric acid, which comprises separating the cellulose acetate from the primary solution in which it is formed, dissolving the same in acetic acid and then adding barium acetate.

CAMILLE DREYFUS.
CLIFFORD IVAN HANEY.